(12) United States Patent
Kezar

(10) Patent No.: US 9,276,449 B2
(45) Date of Patent: Mar. 1, 2016

(54) HVAC ACTUATOR NOISE REDUCER

(71) Applicant: KMC Controls, Inc., New Paris, IN (US)

(72) Inventor: Kevin D. Kezar, New Paris, IN (US)

(73) Assignee: KMC Controls, Inc., New Paris, IN (US)

( * ) Notice: Subject to any disclaimer, the term of this patent is extended or adjusted under 35 U.S.C. 154(b) by 630 days.

(21) Appl. No.: 13/650,870

(22) Filed: Oct. 12, 2012

(65) Prior Publication Data

US 2014/0103753 A1  Apr. 17, 2014

(51) Int. Cl.
*H02K 5/24* (2006.01)
*H02K 5/167* (2006.01)
*H02K 7/08* (2006.01)
*F16F 1/02* (2006.01)
*F16F 1/373* (2006.01)

(52) U.S. Cl.
CPC ...... *H02K 5/24* (2013.01); *F16F 1/025* (2013.01); *F16F 1/373* (2013.01); *H02K 5/1672* (2013.01); *H02K 7/083* (2013.01)

(58) Field of Classification Search
CPC ........... H02K 7/083; H02K 5/24; F16F 1/373; F16F 1/025
USPC ............................. 310/83, 51, 52
See application file for complete search history.

(56) References Cited

U.S. PATENT DOCUMENTS

| | | | |
|---|---|---|---|
| 5,033,875 A | 7/1991 | Moulinet | |
| 5,138,902 A | 8/1992 | Muller et al. | |
| 5,373,210 A * | 12/1994 | Baer et al. | 310/247 |
| 5,852,333 A * | 12/1998 | Strojny et al. | 307/87 |
| 6,140,730 A * | 10/2000 | Tkaczyk et al. | 310/181 |
| 6,536,953 B1 * | 3/2003 | Cope et al. | 384/536 |
| 7,223,020 B2 | 5/2007 | Bauer et al. | |
| 7,611,288 B2 * | 11/2009 | Lew | 384/536 |
| 2003/0042804 A1 * | 3/2003 | Cook et al. | 310/51 |
| 2003/0094871 A1 * | 5/2003 | Schiller et al. | 310/91 |
| 2005/0018935 A1 * | 1/2005 | Simpson et al. | 384/204 |
| 2009/0295258 A1 * | 12/2009 | Caliendo et al. | 310/68 B |
| 2010/0190431 A1 * | 7/2010 | Kurniawan et al. | 454/195 |
| 2011/0005846 A1 * | 1/2011 | Page et al. | 180/8.7 |
| 2011/0169361 A1 * | 7/2011 | Park | 310/91 |
| 2011/0240893 A1 * | 10/2011 | Windgassen | 251/129.13 |
| 2012/0038231 A1 * | 2/2012 | Oda et al. | 310/90 |

* cited by examiner

*Primary Examiner* — Naishadh Desai
(74) *Attorney, Agent, or Firm* — Shewchuk IP Services, LLC; Jeffrey D. Shewchuk

(57) ABSTRACT

An actuator noise reducer reduces the noise output of an HVAC actuator. The noise reducer has a spring arm with a sliding bearing surface which is pressed against a side of the rotating motor shaft. The spring arm introduces a generally radial force on the motor shaft, taking up bearing play and gently pressing the motor shaft into its bearing. A cylindrical hoop mount of the noise reducer mates with and encircles a cylindrical portion of the electrical motor adjacent the shaft for mounting the actuator noise reducer on the motor by axial sliding.

21 Claims, 7 Drawing Sheets

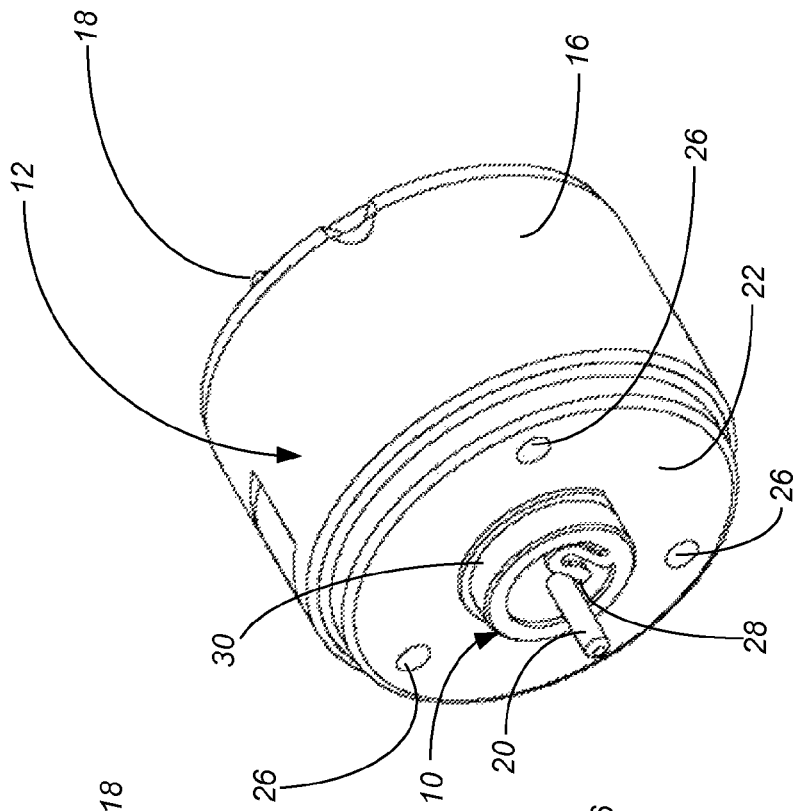
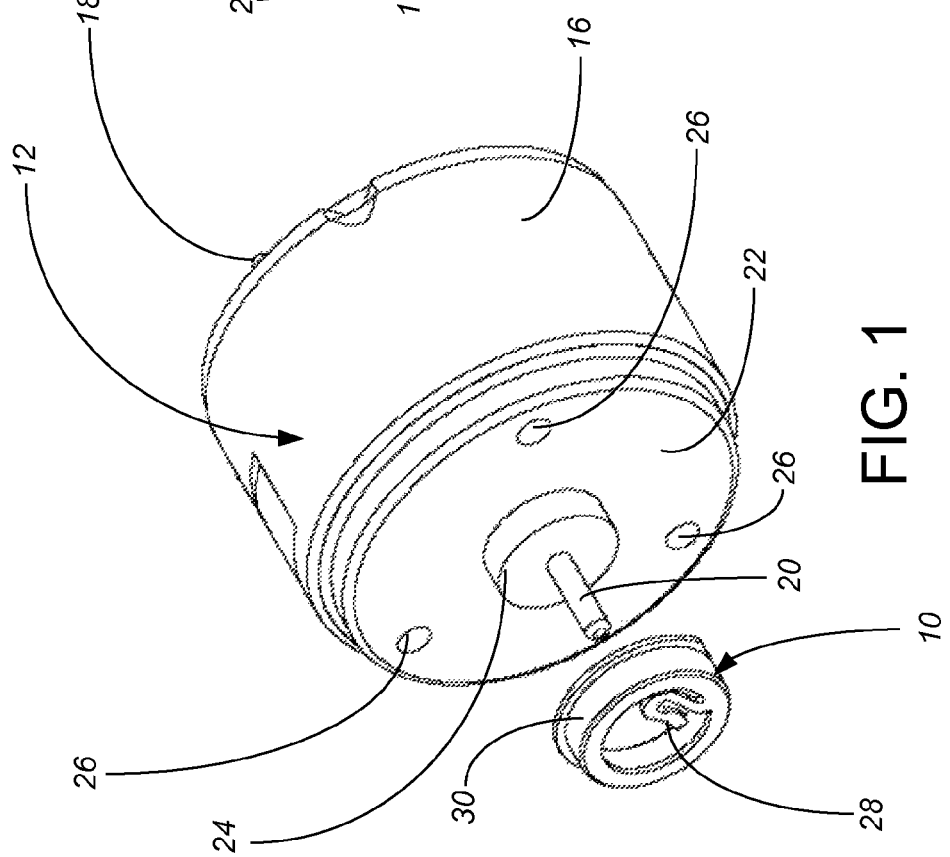

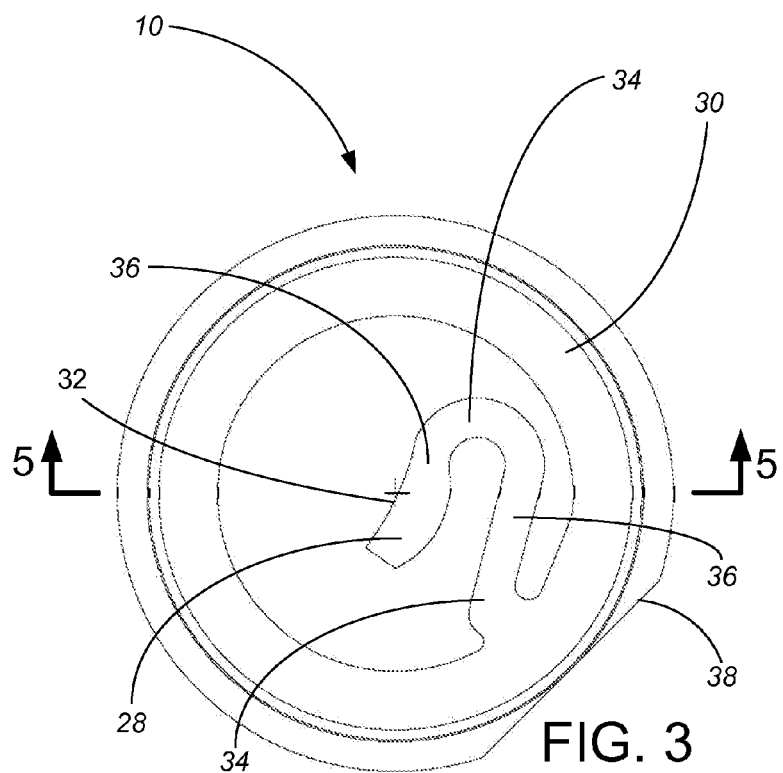
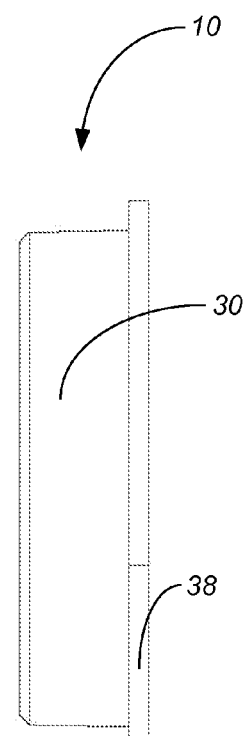
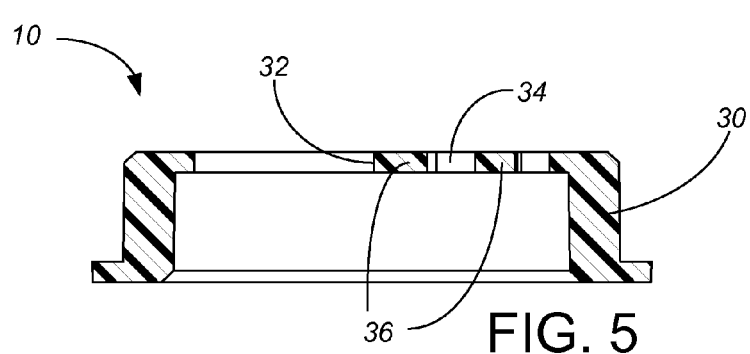

HVAC ACTUATOR NOISE REDUCER

CROSS-REFERENCE TO RELATED APPLICATION(S)

None.

BACKGROUND OF THE INVENTION

The present invention is directed to actuators for valves and dampers, such as used in controlled heating, ventilating and air conditioning ("HVAC") applications. Depending upon the control system being used, such HVAC actuators typically act for a relatively short period of time (a few seconds up to a minutes or two), typically running a few times (perhaps five to ten movements) a day. In the most common applications, the HVAC actuators use a small electrically powered motor which runs at many rpms, through a gear reduction unit to increase torque and reduce the angular output of the HVAC actuator so it appropriately turns the attached valve stem or damper handle.

Some HVAC actuators operate in noisy environments (such as in an industrial plant) or in locations that are not sensitive to noise. Other HVAC actuators, however, are placed in office environments, in libraries, in residences or in other locations that are much more sensitive to sound and noise issues. When the HVAC actuator works to open or close the valve or damper, it can generate sound/noise which disturbs occupants of the building. Such sound/noise can be particularly disconcerting in that the person hearing the HVAC actuator often does not know what device created the sound/noise, or why the sound/noise occurred at that particular moment in time. Accordingly, HVAC actuators should work as quietly as possible. In general, the sound generated by a working HVAC actuator has been viewed as a necessary evil, with the only viable options being to either add a more expensive motor in the HVAC actuator design (leading to a more expensive product), or to have the installer sound insulate around the HVAC actuator or around the motor within the HVAC actuator. Both options increase the total expense of the HVAC actuator. Better solutions are needed.

BRIEF SUMMARY OF THE INVENTION

The present invention is an actuator noise reducer, a motor with an actuator noise reducer thereon, and an actuator having an actuator noise reducer therein. The actuator noise reducer has a spring arm with a sliding bearing surface which is pressed against a side of the rotating motor shaft. The spring arm introduces a generally radial force on the motor shaft, taking up bearing play and gently pressing the motor shaft into its bearing. In the preferred embodiment, the actuator noise reducer includes a cylindrical hoop mount which mates with and encircles a cylindrical portion of the electrical motor adjacent the shaft for mounting the actuator noise reducer on the motor.

BRIEF DESCRIPTION OF THE DRAWINGS

FIG. 1 is a perspective assembly view of the actuator noise reducer of the present invention relative to the motor for which the actuator noise reducer was designed.

FIG. 2 is a perspective view with the actuator noise reducer on the motor.

FIG. 3 is a plan view of the actuator noise reducer of FIGS. 1 and 2.

FIG. 4 is a side view of the actuator noise reducer of FIGS. 1-3.

FIG. 5 is cross-sectional view of the actuator noise reducer taken along lines 5-5 of FIG. 3.

Figure 6:
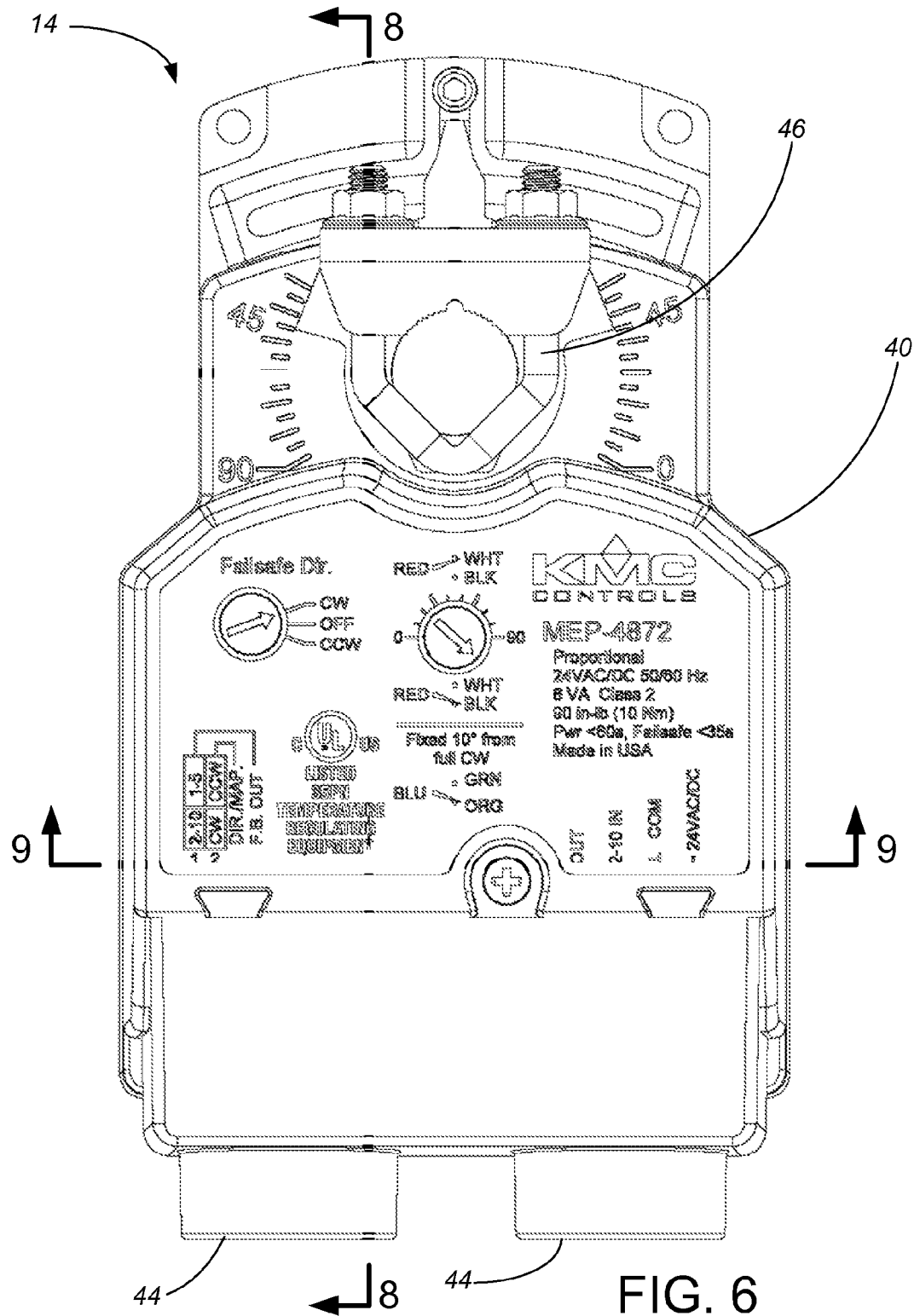
FIG. 6 is a top plan view of an actuator using the actuator noise reducer of the present invention.

While the above-identified drawing figures set forth a preferred embodiment, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

The operation of the noise reducer 10 of the present invention can be understood with reference to FIGS. 1-5, which most clearly show the noise reducer 10. In this case, the noise reducer 10 has been specifically designed to mate and work with a known motor 12 used in an HVAC actuator 14. In typical HVAC actuators (and in the preferred embodiment), the motor 12 runs at speeds in excess of 100 rpms, and usually at speeds of 1000 rpms or more. This relatively fast motor output speed is then geared down to increase torque and reduce the angular output of the HVAC actuator 14. For valve applications, the maximum stroke of the actuator is several turns (say, 1080° or less), and more commonly with a maximum stroke of about 90°. With damper applications, the maximum stroke of the actuator is commonly 180° or less. The HVAC actuators typically have a peak torque output of 10 in-lbs or more to up to about 400 in-lbs, such as low torque models rated at about 40 in-lbs and high torque models rated at about 320 in-lbs.

The depicted motor 12 is a long shaft DC motor rated at 24 VDC, commercially available from Douglas International, Inc. of Geneva, Ill. as model no. KE588. It has a rated load of 1.0 in-oz (0.06 in-lbs, or 72 g-cm), drawing about 130 mA and running at 2100±250 rpm at rated load. At no load, the preferred motor 12 draws about 15 mA and runs at 3250±350 rpm.

The housing 16 of the motor 12 is generally cylindrical, with an outer diameter of about 1.4 inches (36 mm) and a length of about 1 inch (26 mm). Positive and negative electrical terminals 18 project off one end of the housing 16 opposite a motor shaft 20. As well known in the HVAC actuator and motor arts, application of an appropriate electric current to the two electrical terminals 18 causes rotation of the shaft 20 by a rotor/stator combination (not shown) interior to the housing 16. The shaft 20 is rotationally supported by bearings or bushings (not shown) which are also interior to the motor housing 16. In this particular motor 12, an end plate 22 of the housing 16 includes a cylindrical extension 24 around the bearing/bushing, and has several threaded mounting holes 26 in the end plate 22. The cylindrical extension 24 projects just over 0.1 inches (about 3 mm) from the rest of the end plate 22, with an outer diameter of about 0.4 inches (10 mm). While the noise reducer 10 of the preferred embodiment is specifically designed to mate with the size and shape of this particular motor 12, the noise reducer can be alternatively designed to mate with motors having widely varying external shapes.

The shaft could be rectangular or hexagonal or otherwise shaped with one or more flats to mate into a gear, but in the preferred motor 12 the shaft 20 is cylindrical. The shaft 20 has a thickness appropriate for the torque being transferred, such as typically with a diameter in the range of 0.05 to 0.25 inches (1 to 6 mm). The shaft 20 of the preferred motor 12 has a diameter of less than 0.1 inches (about 2 mm), extending for a length of about 0.3 inches (about 7 mm) beyond the cylindrical extension 24.

While this motor 12 is relatively low cost and reliable for its intended use in the HVAC actuator 14, it generates more noise than desired while running. The present invention involves the discovery that the noise output of the motor 12 can be reduced by placing a sideways force on the shaft 20 as it projects beyond the cylindrical extension 24. In general terms, most designers using motors would try to avoid such a sideways force (i.e, a force in one radial direction) on the shaft 20 as detrimental to motor performance. Specifically, the sideways force on the shaft 20 tends to increase wear in the bearings/bushings, reduces the torque output of the motor 12 due to unnecessary drag, and tends to cause misalignment of the rotor/shaft relative to the stator within the housing 16. For an HVAC actuator, however, these downsides are insignificant. With the HVAC actuator 14 having a total run time of only a few minutes per day, bearing or bushing wear is seldom a significant contributing cause for motor failure. Further, with a properly designed noise reducer 10, the trade-off of lower torque is well worth the reduction in sound output of the HVAC actuator 14 while running.

The sideways force is placed onto the shaft 20 by a spring arm 28. The spring arm 28 extends from a hoop section 30 of the noise reducer 10 which mounts the noise reducer 10 relative to the motor 12 and/or actuator 14. The spring arm 28 has a bearing surface 32 on its free distal end which rides on the cylindrical side surface of the shaft 20 at a location just past the end of the cylindrical extension 24. While numerous designs of spring arms could be used, the preferred spring arm 28 includes two fold locations 34 separating two relatively straight lengths 36 of the spring arm 28. Most of the deflection of the spring arm 28 is provided by bending of the material at these two fold locations 34. In the preferred embodiment, the spring arm 28 is molded to be about 0.02 inches (0.5 mm) thick, with the width of the spring arm 28 ranging between about 0.04 and 0.05 inches (1-1.2 mm). Numerous other geometries for the spring arm could alternatively be used.

The amount of deflection of the spring arm 28 is designed based upon the magnitude of the spring force desired and the geometrical configuration of the spring arm 28 to achieve that magnitude of spring force. For many configurations, the desired sideways spring force is achieved by a deflection of the bearing surface 32 by a distance within a range of 0.004 to 0.2 inches (0.1 to 5 mm). In the preferred design, the unbiased position of the bearing surface 32 coincides with the shaft axis. Thus, placement of the noise reducer 10 onto the motor 12 requires deflecting the bearing surface 32 of the spring arm 28 by an amount equal to the radius of the shaft 20, which for the preferred motor 12 is about 0.04 inches (1 mm).

The spring constant for the spring arm 28 is also designed based upon the magnitude of the spring force desired and the geometrical configuration of the spring arm 28 to achieve that magnitude of spring force, and further considering the tolerances of the motor 12 and placement of the noise reducer 10. In general, the desired spring force can be achieved with springs having a spring constant within a range of 0.5 to 500 pounds per inch.

The spring arm 28 provides a sideways force on the shaft 20 which is appropriate for the particular motor 12 to reduce the noise output of the motor 12, and can be readily determined by placing a range of different forces on the motor 12 and seeing how noise output is reduced relative to the reduction in torque output. In HVAC actuators, the sideways force that the actuator noise reducer 10 places on the motor shaft 20 is generally within a range of 0.1 to 5 pounds to result in the desired noise reduction. With the preferred motor 12, a sideways force within the range of 0.3 to 1.2 pounds has been found to adequately reduce motor noise. With the geometrical configuration and size of the preferred embodiment, forming the noise reducer 10 of DELRIN (Unfilled Acetal) results in a sideways force of about 0.38 lbs, forming the noise reducer 10 of LUBRICOMP (Nylon 6/6 w/10% aramid fibers & 10% PTFE) results in a sideways force of about 0.40 lbs, and forming the noise reducer 10 of ULTRAMID (35% Glass filled Nylon 6/6) results in a sideways spring force of about 1.2 lbs. That is, with a deflection of 0.04 inches (1 mm), the preferred shape results in spring constants of about 9 pounds per inch (DELRIN and LUBRICOMP) to about 30 pounds per inch (ULTRAMID). By molding the noise reducer 10 out of a polymer material, the noise reducer 10 can be easily formed at low cost, while providing the design flexibility needed to mate with various motors used in HVAC actuators and achieve desired spring forces on the motor shafts.

The amount of noise reduction achieved by the noise reducer 10 should be audibly perceptible, such as a reduction of at least 3 dB, and more preferably a reduction of at least 5 dB. The preferred embodiment reduces the noise output of the actuator 14 by about 10 to 15 dB or more. While various causes internal to the motor 12 may contribute to the sound output of the motor 12, it is believed that the noise reducer 10 significantly takes up about 0.0002 to 0.0003 inches (0.005 to 0.008 mm) of bearing play (difference between motor shaft diameter and motor bearing diameter).

The sideways force does introduce friction and thereby reduces the efficiency of the motor 12 slightly, but not overly so. For instance, the noise reducer 10 may reduce the no-load running speed of the motor 12 by an amount within the range of 0.5 to 20%, and more preferably within the range of 1 to 10%. Measurements were taken of the reduction of no-load running speed of the motor 12 with the preferred embodiment as follows. Without the noise reducer 10, a sampled motor 12 ran at 3113 rpm in the clockwise direction and at 3068 rpm in the counterclockwise direction. A preferred noise reducer 10 molded of DELRIN reduced these speeds to 3000 rpm (3.6% reduction) in the clockwise direction and to 2955 rpm (3.7% reduction) in the counterclockwise direction. A preferred noise reducer 10 molded of LUBRICOMP reduced these speeds to 3071 rpm (1.4% reduction) in the clockwise direction and to 3023 rpm (1.5% reduction) in the counterclockwise direction. A preferred noise reducer 10 molded of ULTRAMID reduced these speeds to 2894 rpm (7.0% reduction) in the clockwise direction and to 2839 rpm (7.5% reduction) in the counterclockwise direction.

Figure 7:
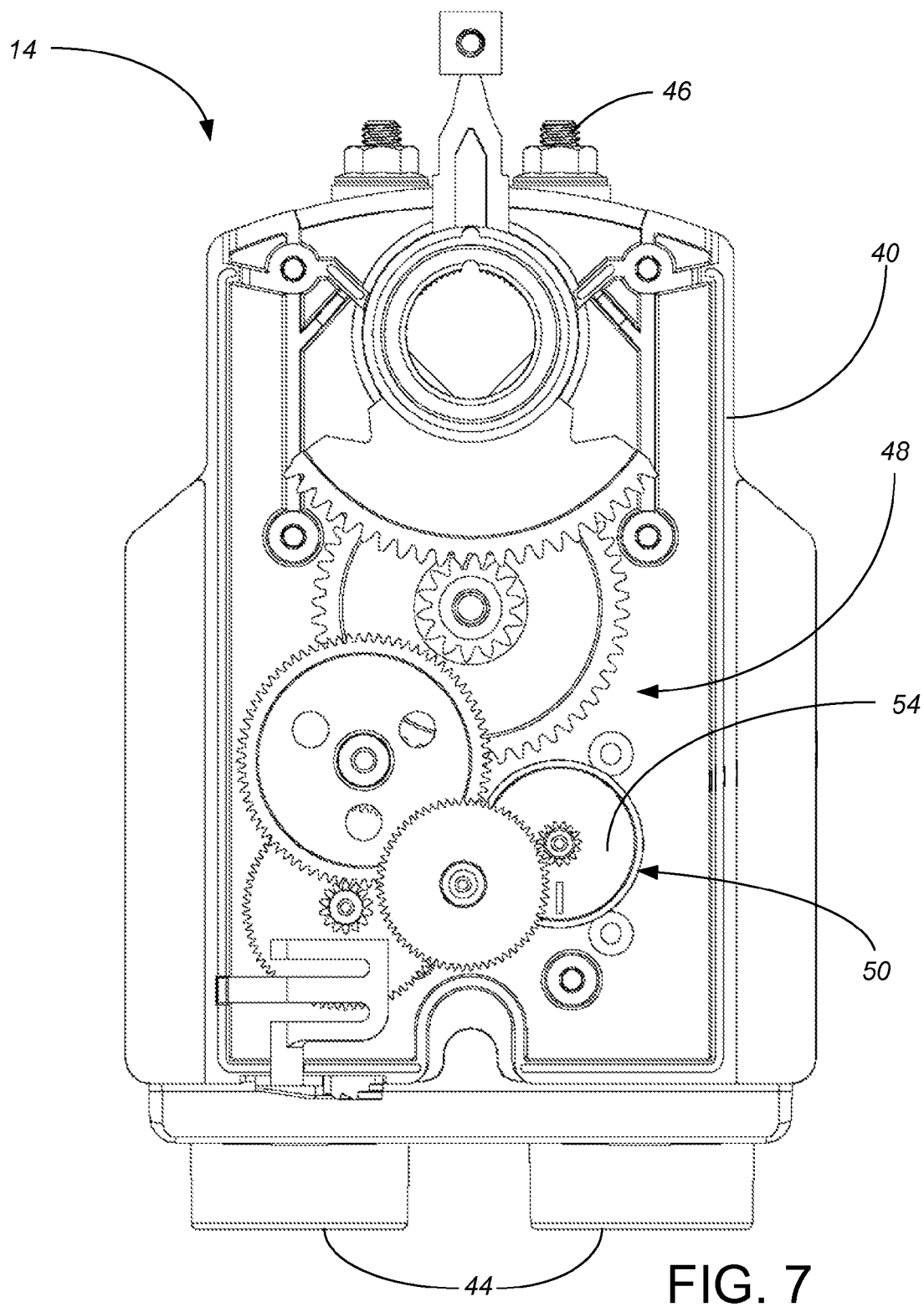
FIG. 7 is a bottom plan view of the actuator of FIG. 6 with the bottom plate removed to show the gear train of the actuator.
Figure 8:
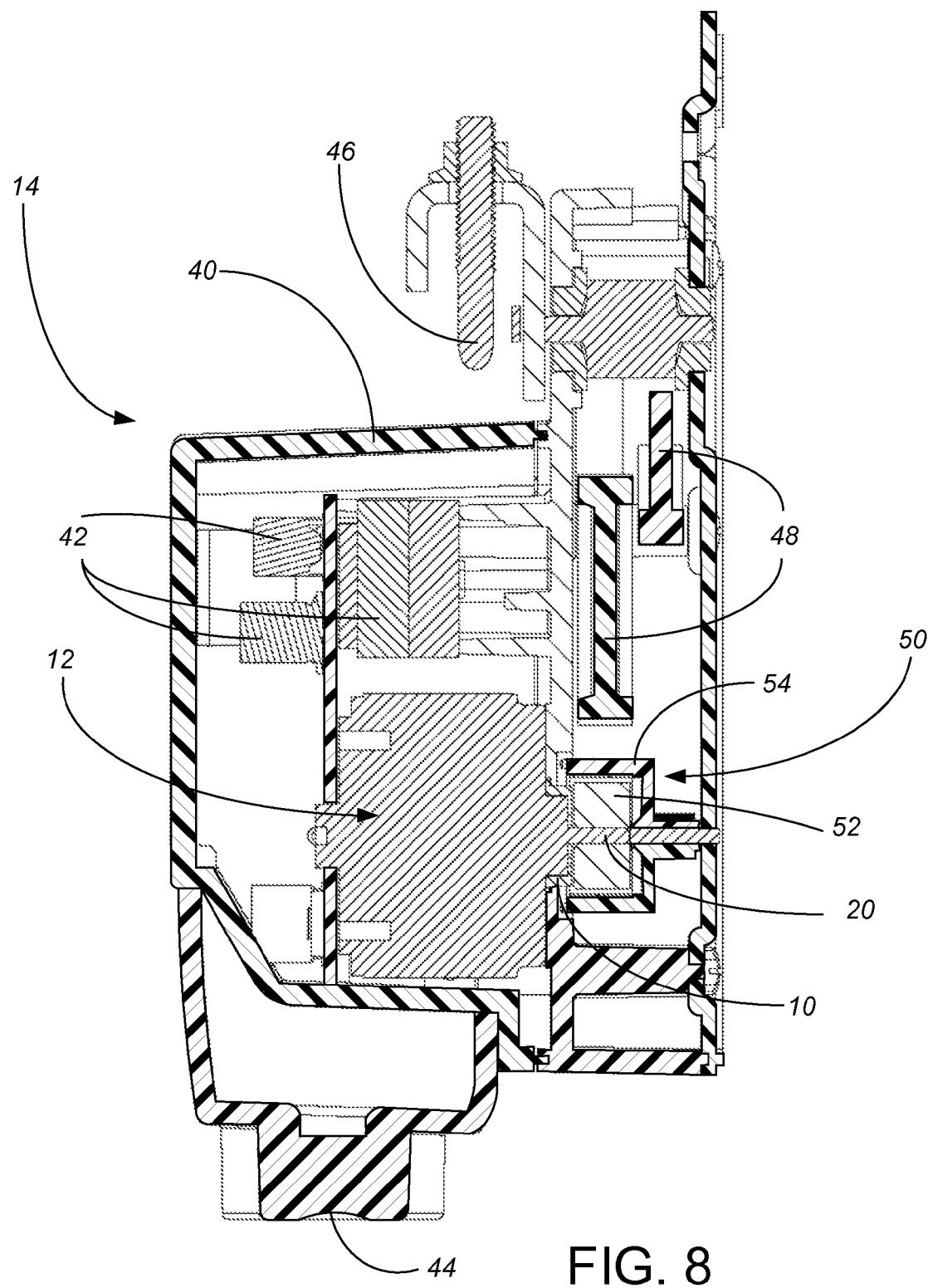
FIG. 8 is a cross-sectional view of the actuator taken along lines 8-8 of FIG. 6.
Figure 9:
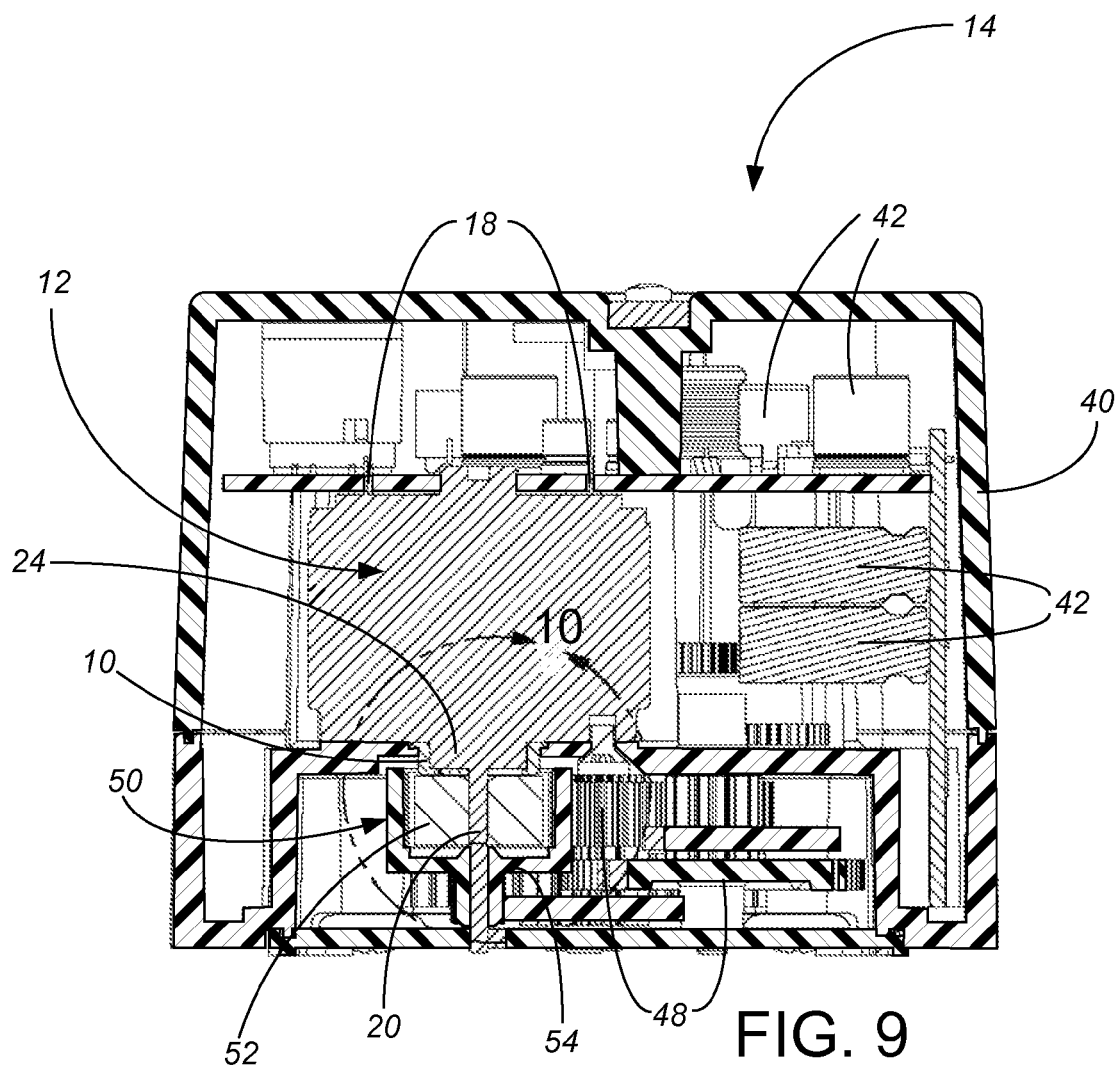
FIG. 9 is a cross-sectional view of the actuator taken along lines 9-9 of FIG. 6.
Figure 10:
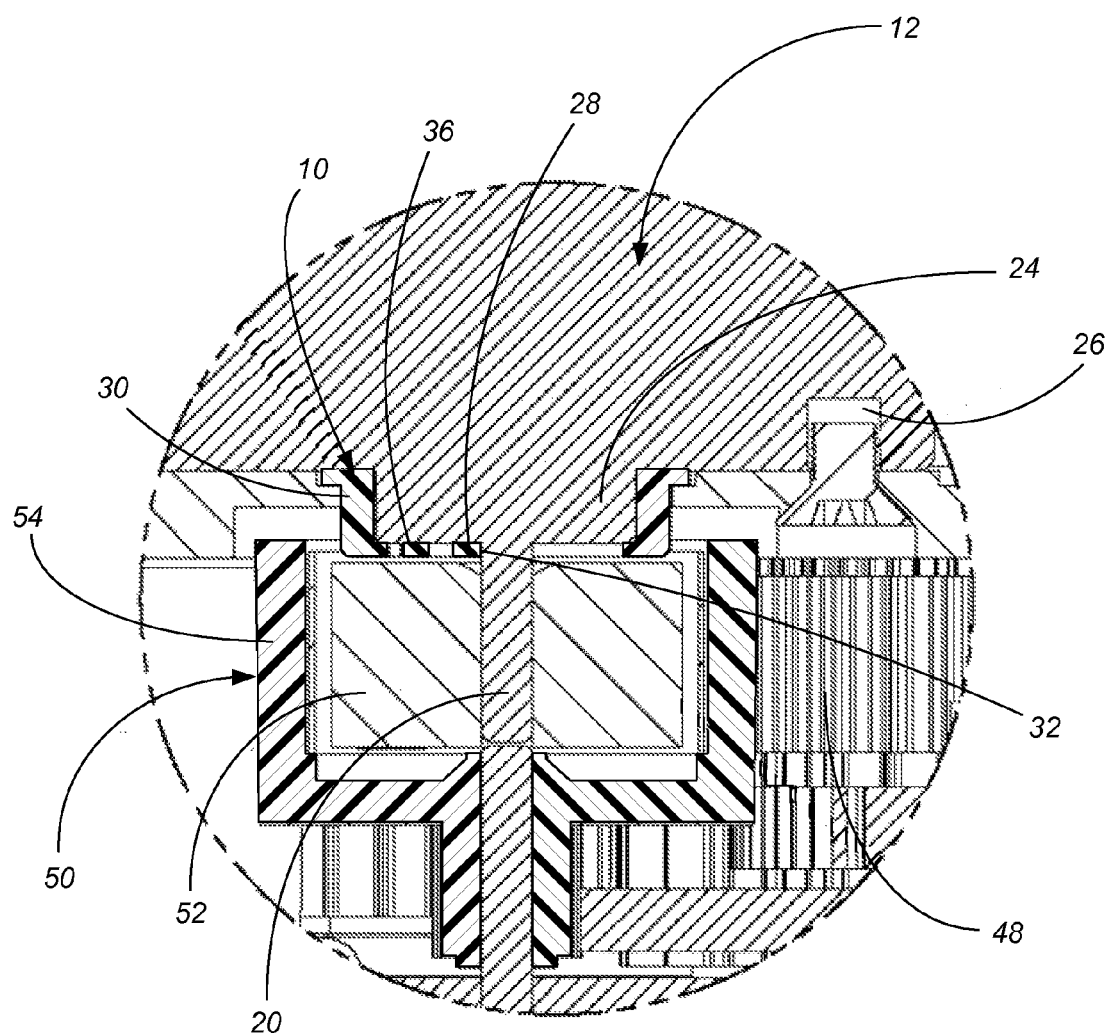
FIG. 10 is an enlargement of a portion of FIG. 9.

The cylindrical extension 24 provides a convenient location for attachment of the noise reducer 10 of the present invention. The noise reducer 10 includes a peripheral hoop 30 of the same size and shape as the end plate extension 24, and the peripheral hoop 30 of the noise reducer 10 is used to secure the noise reducer 10 into position relative to the motor 12. In this case, because the end plate extension 24 is cylindrical, the peripheral hoop 30 is also cylindrical. The hoop 30 encircles the shaft axis, such that the force provided onto the shaft 20 by the spring arm 28 is transmitted through the hoop 30 directly to the motor housing 16. Due to the shape of the housing 16, the hoop 30 can be slid axially onto the cylindrical extension 24 to conveniently attach the noise reducer 10 to the motor 12 with a friction fit. The peripheral hoop 30 is tight enough and has enough surface contact with the cylindrical extension 24 that friction between the peripheral hoop 30 and the cylindrical extension 24 prevents the noise reducer 10 from rotating with the shaft 20. A flat 38 may be provided in one side of the peripheral hoop 30 so the noise reducer 10 better mates with the housing 40 of the actuator 14. The flat 38 can also be used to prevent rotation of the noise reducer 10 with the shaft 20. Alternatively, the noise reducer 10 could attach to the mounting holes 26 provided in the end plate 22 of the housing 16, or could attach to the outer cylindrical surface of the motor housing 16, or could attach to the motor housing 16 in another way. As another alternative, the noise reducer could attach to other structure within the actuator 14 (shown in FIGS. 6-10) separate from the motor 12, i.e., such that the noise reducer didn't directly attach to the motor 12 at all. For instance, the noise reducer could be formed as part of the actuator housing 40, or be attached to the actuator housing 40 or the motor 12 with one or more fasteners such as screws (not shown) or with adhesive. By having the hoop section 30 slide axially onto the cylindrical extension 24 of the motor housing 16, a very consistent fit is achieved for placement of the noise reducer 10 onto the motor 12, so the designed spring force is easily achieved within tolerances during production.

FIGS. 6-10 depict an actuator 14 using the noise reducer 10 of the present invention. The actuator 14 largely consists of a housing 40 enclosing various electronic components 42, with one or more wiring openings 44. An output section 46 can have any of numerous shapes and designs to mate with a damper or valve, with the depicted actuator 14 having a U-bolt attachment 46 which can be tightened around a stem of a valve or a handle of a damper (not shown). The particular actuator 14 depicted is similar to a model MEP-4872 actuator commercially available from KMC Controls of New Paris, Ind., which is rated at 80 in-lb of torque. The motor 12 is one of the components mounted within the housing 40, with a gear train 48 coupling the motor shaft 20 to the U-bolt attachment 46. In most HVAC actuators, the gear train 48 will provide a gear ratio of 1000 to 1 or more, such that the motor 12 turns the output shaft connector 46 through its total travel in a time period within the range of 5 seconds to 5 minutes. In this instance, the gear train 48 includes 6 gears, providing a total gear ratio of about 2700 to 1. The 2700 to 1 gear ratio causes the motor 12 running at 2100 rpm to rotate the U-bolt output 46 a full stroke 90° in about 19 seconds, while at no-load the motor 12 running at 3250 rpm will rotate the U-bolt output 46 a full stroke 90° in about 12.5 seconds. If the noise reducer 10 reduces the running speed of the motor 12 by less than 10%, then the additional run time for full stroke travel introduced by the noise reducer 10 is less than 2 seconds.

If desired, the gear train 48 can be formed with all plastic gears, or alternatively a metal gear can be used on the final gear stage(s) to withstand increased torque. While different gear trains can be used to produce different torque ratings, in the preferred embodiment different torque ratings are achieved using the same gear train 48 with the use of a magnetic hysteresis clutch 50. This clutch 50 consists of a magnet 52 pressed onto the motor shaft 20 that drives a plastic ring cup 54 containing a rotor ring (rolled strip of hysteresis metal). As the shaft 20/magnet 52 rotates, the rotor ring/ring cup 54 rotates with the magnet 52 until a predetermined slip torque is reached. At this point the shaft 20/magnet 52 continues to rotate and the ring cup 54 stalls out. The slip torque can be varied by changing the strength of the magnet 52, by modifying the air gap between the magnet 52 and the rotor ring 54, or by changing the volume of the rotor ring material. Assuming a 93% efficient gear train 48, the rated output torque/nominal output stall torque/nominal clutch torque of the three torque ranges are as follows: 25 in-lb/45 in-lb (clutch slips at 0.018 in-lb), 45 in-lb/65 in-lb (clutch slips at 0.025 in-lb), and 90 in-lb/112 in-lb (clutch slips at 0.044 in-lb).

Although the present invention has been described with reference to preferred embodiments, workers skilled in the art will recognize that changes may be made in form and detail without departing from the spirit and scope of the invention.

The invention claimed is:

1. A motor with an actuator noise reducer thereon for use in an HVAC actuator, comprising:
   a motor comprising:
      a motor housing having an exterior shape;
      two electrical terminals accessible outside the motor housing for application of an electric current; and
      a motor shaft projecting outside the motor housing, the motor shaft rotating relative to the motor housing about a shaft axis upon application of an electric current across the two electrical terminals, wherein the motor shaft is cylindrical with a diameter in the range of 1 to 3 mm; and
   an actuator noise reducer, having a shape which mates with the exterior shape of the motor housing so as to be attachable to the motor housing, the actuator noise reducer comprising:
      a spring arm extending to a distal end; and
      a bearing surface on the distal end of the spring arm, which, when the actuator noise reducer is attached in its mating position to the motor housing, bears against a side of the motor shaft with a sideways force on the motor shaft;
   wherein the motor shaft deflects the bearing surface on the distal end of the spring arm by a distance within a range of 0.1 to 5 mm.

2. The motor with an actuator noise reducer thereon of claim 1, wherein the actuator noise reducer:
   a mounting base mating with at least a portion of the motor housing.

3. The motor with an actuator noise reducer thereon of claim 2, wherein the mounting base is a peripheral hoop which encircles the shaft axis, which peripheral hoop can be slid onto the motor.

4. The motor with an actuator noise reducer thereon of claim 3, wherein the peripheral hoop is cylindrical and can be secured to the motor with a friction fit.

5. The motor with an actuator noise reducer thereon of claim 2, wherein the spring arm includes two fold locations.

6. The motor with an actuator noise reducer thereon of claim 2, wherein the bearing surface, on an unbiased spring arm, coincides with the shaft axis, such that the deflection of the spring arm during use is a radius of the shaft.

7. The motor with an actuator noise reducer thereon of claim 2, wherein the spring arm provides a spring constant within a range of 0.5 to 500 pounds per inch.

8. The motor with an actuator noise reducer thereon of claim 2, wherein the actuator noise reducer is formed of a molded polymer material.

9. The motor with an actuator noise reducer thereon of claim 1, wherein the sideways force that the actuator noise reducer places on the motor shaft has a magnitude of 0.1 to 5 pounds.

10. A motor with an actuator noise reducer thereon for use in an HVAC actuator, comprising:
   a motor comprising:
      a motor housing having an exterior shape;
      two electrical terminals accessible outside the motor housing for application of an electric current; and
      a motor shaft projecting outside the motor housing, the motor shaft rotating relative to the motor housing about a shaft axis upon application of an electric current across the two electrical terminals, wherein the motor is rated to run without load in excess of 1000 rpm; and
   an actuator noise reducer, having a shape which mates with the exterior shape of the motor housing so as to be attachable to the motor housing, the actuator noise reducer comprising:
      a spring arm extending to a distal end; and
      a bearing surface on the distal end of the spring arm, which, when the actuator noise reducer is attached in its mating position to the motor housing, bears against a side of the motor shaft with a sideways force on the motor shaft;
   wherein the actuator noise reducer reduces the no-load running speed of the motor by an amount within the range of 0.5 to 10%.

11. The motor with an actuator noise reducer thereon of claim 10, wherein the motor shaft is cylindrical with a diameter in the range of 1 to 3 mm, and wherein the motor shaft deflects the bearing surface on the distal end of the spring arm by a distance within a range of 0.1 to 5 mm.

12. The motor with an actuator noise reducer thereon of claim 1, wherein the actuator noise reducer attaches onto the motor housing by sliding axially onto the motor housing.

13. The motor with an actuator noise reducer thereon of claim 1 housed within an actuator housing, the motor being electrically connected to an electrical circuit within the actuator housing for driving the motor with an electric current, the motor shaft being coupled to a gear train within the actuator housing for reducing the angular output and increasing the torque output of the motor, with an output shaft connector coupled to the gear train and accessible outside the actuator housing, the output shaft connector being adapted for attachment to a valve stem or damper stem of an HVAC valve or HVAC damper.

14. The motor with an actuator noise reducer thereon of claim 13, wherein the motor is a 24 VDC motor.

15. The motor with an actuator noise reducer thereon of claim 13, wherein the gear train provides a gear ratio of more than 1000 to 1.

16. The motor with an actuator noise reducer thereon of claim 13, wherein the motor turns the output shaft connector a total travel of no greater than 180°.

17. The motor with an actuator noise reducer thereon of claim 16, wherein the motor, when unloaded, turns the output shaft connector through its total travel in a time period within the range of 5 seconds to 5 minutes.

18. The motor with an actuator noise reducer thereon of claim 13, wherein the output shaft connector delivers a torque in the range of 10 to 400 inch-lbs.

19. The motor with an actuator noise reducer thereon of claim 13, wherein the actuator noise reducer lowers the sound output of the HVAC actuator during operation by at least 5 dB.

20. A motor with an actuator noise reducer thereon for use in an HVAC actuator, comprising:
   a motor comprising:
      a motor housing having an exterior shape;
      two electrical terminals accessible outside the motor housing for application of an electric current; and
      a motor shaft projecting outside the motor housing, the motor shaft rotating relative to the motor housing about a shaft axis upon application of an electric current across the two electrical terminals; and
   an actuator noise reducer, having a shape which mates with the exterior shape of the motor housing so as to be attachable to the motor housing, the actuator noise reducer comprising:
      a spring arm extending to a distal end; and
      a bearing surface on the distal end of the spring arm, which, when the actuator noise reducer is attached in its mating position to the motor housing, bears against a side of the motor shaft with a sideways force on the motor shaft;
   wherein the motor with an actuator noise reducer thereon is housed within an actuator housing, the motor being electrically connected to an electrical circuit within the actuator housing for driving the motor with an electric current, the motor shaft being coupled to a gear train within the actuator housing for reducing the angular output and increasing the torque output of the motor, with an output shaft connector coupled to the gear train and accessible outside the actuator housing, the output shaft connector being adapted for attachment to a valve stem or damper stem of an HVAC valve or HVAC damper, wherein the motor turns the output shaft connector a total travel of no greater than 180°.

21. The motor with an actuator noise reducer thereon of claim 20, wherein the motor, when unloaded, turns the output shaft connector through its total travel in a time period within the range of 5 seconds to 5 minutes.

* * * * *